United States Patent [19]

Laidig

[11] 4,015,734
[45] Apr. 5, 1977

[54] SWEEP AUGER FOR BOTTOM SILO UNLOADERS

[75] Inventor: Jonathan J. Laidig, Mishawaka, Ind.

[73] Assignee: Laidig Silo Unloaders, Inc., Mishawaka, Ind.

[22] Filed: Aug. 14, 1975

[21] Appl. No.: 604,655

[52] U.S. Cl. .............................. 214/17 DA; 198/661
[51] Int. Cl.² ........................................ B65G 65/46
[58] Field of Search ................. 214/17 DA, 17 DB; 302/50, 56; 198/214, 213, 661

[56] References Cited
UNITED STATES PATENTS

| 2,970,827 | 2/1961 | Dodson | 214/17 DB |
| 3,403,795 | 10/1968 | Schaefer | 214/17 DA |
| 3,451,567 | 6/1969 | Laidig | 214/17 DA |
| 3,851,774 | 12/1974 | Laidig et al. | 214/17 DA |

FOREIGN PATENTS OR APPLICATIONS

| 1,232,198 | 10/1960 | France | 214/17 DA |

Primary Examiner—Trygve M. Blix
Assistant Examiner—Charles E. Frankfort
Attorney, Agent, or Firm—Johnson, Dienner, Emrich & Wagner

[57] ABSTRACT

A bottom silo unloader is disclosed in which a tapered sweep auger has its inner end of largest diameter supported for rotation about a transverse vertical axis at the center of a silo so that it sweeps over the silo floor as it is also rotated on its longitudinal axis to feed material to a center-located hopper therebelow with which a discharge auger communicates. The outer smaller end of the sweep auger is spaced off the silo floor and unsupported other than through the driven inner end. In its specifically disclosed form the tapered shaft of the sweeper auger is composed of three equal length sections of constant diameter, the diameters of which are progressively increased from shaft section to shaft section in the direction of the supported inner end of the sweep auger. The helical flight about the shaft sections have a constant radial depth and related pitch so that the loading capacity of the sweep auger increases from a minimum on its unsupported outer shaft section to a maximum on its shaft section closest to the center of the silo.

7 Claims, 4 Drawing Figures

SWEEP AUGER FOR BOTTOM SILO UNLOADERS

This invention relates to bottom silo unloaders and particularly to a novel improved construction of sweep auger therefore.

In my Assignee's U.S. Pat. 3,851,774, of which I am a co-inventor, there is disclosed a bottom silo unloader that is particularly useful for discharging moist grain and/or silage from a sealed silo in which the same is stored. Such an unloader has an axially rotating sweep auger which swings on the vertical axis of the silo to effectively sweep across and about the silo floor to feed the grain and/or silage into a centrally located discharge hopper or caser in the silo floor therebelow. Communicating with said discharge hopper is a discharge auger rotatably supported in a tube that is set in the silo floor and leads from the interior of the discharge hopper to outside the silo. Rotation of the discharge auger is effected by drive means located adjacent the outer end of the tube and the inner end of the discharge auger is drivingly connected to the inner end of the sweep auger through vertically aligned right angle gear boxes and a connecting vertical shaft such that the sweep auger rotates on its axis with rotation of the discharge auger. A ring gear on which the upper gear box is mounted and to which the inner end of the sweep auger is mounted is rotated on the vertical shaft from the drive means so that the sweep auger rotates about the vertical axis of the silo.

In said bottom silo unloader a torsion arrangement including a slip mechanism suspends rotation of the ring gear when the sweep auger encounters heavy resistance to its movement over the silo floor. The sweep auger, by reason of its connection to the discharge auger, however, continues to rotate until the resistance is eliminated.

The arrangement works well where the resistance is due to encounter with particularly densely packed silage which the sweep auger is above to collect and discharge to the hopper. However, where the unloader is being utilized in a storage bin or silo containing free flowing material, such as fine grain or shelled corn of low moisture content, such temporary cessation of movement of the sweep auger may not be sufficient to relieve the resistance to its sweep. Where the sweep auger embodies a helix of constant radial height and pitch arranged about a uniformly diametered shaft as shown in said patent, material adjacent the silo wall draining into the outer end of the auger can completely fill the auger channel defined between the turns of the helical flighting, leaving no room for additional material closer to the center of the silo to also enter and be conveyed by the sweep auger into the discharge hopper. Resistance to the sweepwise movement of the auger can then build up in the center of the silo; and when the force required to push the sweep auger into the material which is not being collected becomes too great, the unloader breaks down.

In U.S. Pat. No. 3,259,538 the disclosed sweep auger is described as a screw conveyor provided with screw threads of progressively increasing height which facilitate movement of the slurry into a centrally located discharge conduit. In U.S. Pat. No. 3,403,795 a sweep auger in a bottom silo unloader is described as composed of sections having progressively increased diameters in a direction away from the center of the silo, the outer diameter or periphery of its flighting remaining constant throughout the length of the auger. In both of these arrangements the sweep auger is turned on its axis by drive means connected to its inner end disposed at the center of the silo and is rotated on the central vertical axis of the silo by a second drive means connected to the outer end thereof and adjacent the silo wall.

However, in accordance with the present invention, I taper the shaft of the sweep auger while retaining the helical flighting at a constant radial height and support the auger with the larger end of its shaft at the vertical axis of the silo where it is drivingly connected to the mechanisms which rotate it on the vertical axis of the silo and also on its own axis. In the preferred form of the invention the tapered shape of the auger shaft is obtained by constructing it of separately formed cylindrical members which I telescopically connect, each having a helical flight thereabout, the radical height which is constant. This I have found produces a strong rigid and rugged structure and one requiring less power to drive, because of the lesser resistance which the otherwise unsupported smaller remote end of the auger meets at the sidewall of the silo and also because the auger cuts along its full length.

Another feature of the invention is that without increasing the radial depth of the material conveying channel which the helical flighting about the auger shaft defines, I am able to increase the loading capacity of the channel in its feed or conveying direction toward the discharge hopper. Thus all of the material which loads into the sweep auger adjacent the silo wall can be handled while leaving room for collection of additional material along its length closer to the center of the silo. The sweepwise movement of the auger is therefore not restricted.

The novel configuration of the sweep auger also promotes an increased wider cut at the center of the silo which further reduces the resistance which the sweep auger meets in its sweepwise movement about the vertical axis of the silo.

Also, because of its configuration, the auger is spaced off the silo floor, and operates completely surrounded by the free flowing mass so that there is less frictional resistance to its rotation. The incrementally increased outer and inner diameters of the auger flighting also tend to increase the flow rate of the material through the auger as it is rotated.

Many other advantages and/or features of the invention will be at once apparent or will become so upon consideration of the preferred embodiments of the invention which now will be described.

Referring now to the drawings.

Figure 1:
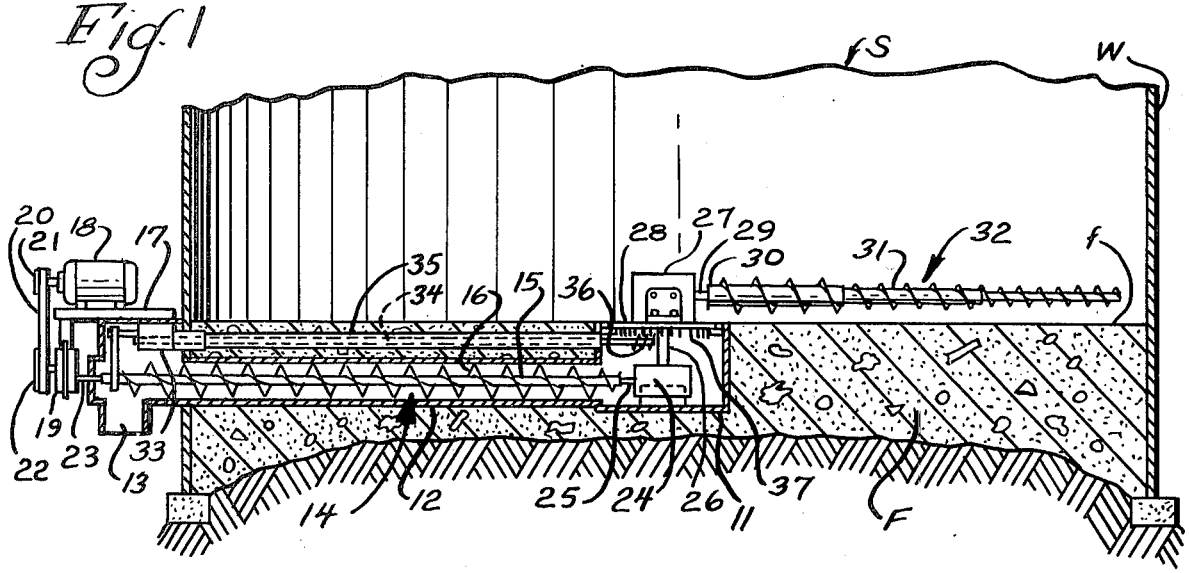
FIG. 1 is a generally schematic view through the foundation and the lower end portion of a silo provided with a bottom unloader embodying a sweep auger according to the present invention.

Referring now more particularly to the several views wherein like parts are identified by like reference numerals and first to FIG. 1, a silo indicated generally at S has a concrete foundation F with a horizontal top surface providing a floor $f$; and a continuous silo wall W surrounds the foundation and extends upwardly. The upper end (not shown) of the silo is closed by a roof which may be sealed and also provided with any suitable breather structure for preventing air from coming into contact with material stored in the silo while at the same time permitting expansion and constraction of air in the top of the silo as the ambient temperature changes.

At the center of the silo floor is a discharge opening in which a casing or discharge hopper 11 is positioned in the foundation and from a hole in one side of the casing 11 a discharge tube 12 which is embedded in the foundation extends outside the silo where it is provided with a discharge opening 13. A discharge conveyor in the form of a discharge auger 14, mounted in the discharge tube 12, includes an auger shaft 15 and a helix 16.

Mounted on the projecting outer end of the discharge tube 12 is a motor mounting platform 17 on which an electric motor 18 is supported. Suspended from the platform 17 is a reduction gear unit 19 which is driven from motor 18 by a drive belt 20 that is trained around a motor sheave 21 and an input sheave 22 on the input shaft of the reduction gear unit 19. An output shaft 23 of the unit 19 is directly coupled to the discharge auger shaft 15.

In the discharge hopper 11 is a lower right angle gear box 24 that has an input shaft 25 directly coupled to the discharge auger shaft 15; and a vertical shaft 26 which is on the vertical axis of the silo connects the lower right angle gear box 24 with an upper right angle gear box 27 carried on a horizontal ring gear 28 that is mounted on the top of hopper 11 for rotation about the axis of the vertical shaft 26. The upper right angle gear box 27 has an output shaft 29 which is directly coupled to the inner end 30 (FIGS. 1 and 2) of the shaft 31 of a sweep auger 32 at an angle (illustrated as horizontal) such that it is spaced off the silo floor $f$. The ring gear 28 is rotated by a ring gear drive means indicated generally at 33 which includes an intermittent motion device and slip mechanism (not shown), applying torque to a long shaft 34 that is carried in a tube 35 embedded in the foundation of the silo and extending into the hopper 11 where it has a worm 36 that is in driving engagement with equally spaced depending studs 37 of the ring gear 28. Thus rotation of shaft 34 causes the ring gear 28 to rotate. Rotation of the ring gear rotates the sweep auger around the axis of vertical shaft 26 (and of the silo) as the unloader operates so as to progressively bring the sweep auger helix into contact with the material in the bottom of the silo to collect the material and feed it into the hopper 11 for removal by the discharge auger 14.

Such a construction of bottom silo unloader is more particularly shown and described in U.S. Pat. No. 3,851,774 supra to which reference may be had for a more complete description and understanding of its construction and operation. The present invention contemplates a novel and improved construction of sweep auger for the unloader of said patent although it is not limited in its use thereto.

Figure 2:
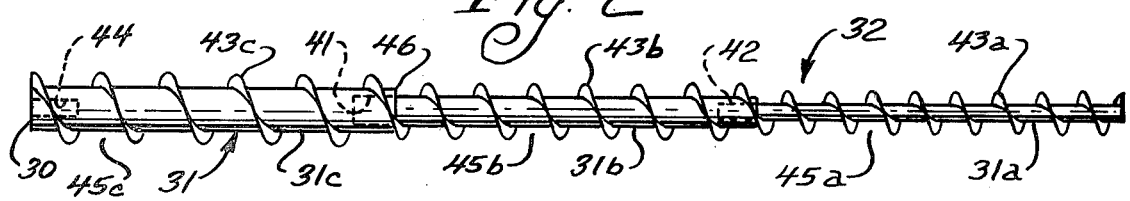
FIG. 2 is a side elevational view on a larger scale of a stepped sweep auger in accordance with the invention.

Referring therefore now to FIG. 2, auger 32 has a tapered shaft 31 which may be uniformly tapered along its full length but preferably comprises a plurality of cylindrical shaft sections of even length. In FIG. 2 said shaft segments are illustrated as three in number and comprising an outermost shaft section 31a of smallest diameter or cross section, an intermediate shaft section 31b of intermediately sized diameter or cross section and an innermost shaft section 31c of largest diameter or cross section. Innermost shaft section 31c has an opening 41 in one end of which is telescopically received one end of intermediate shaft section 31b and intermediate shaft section 31b has an opening 42 in its opposite end which telescopically receives one end of the outermost shaft section 31a. The telescopically received ends of said intermediate and outermost shaft sections are rigidly connected in respective openings 41 and 42 in any suitable manner as by a press fit. They may also be welded or pinned. Welded or otherwise secured about the surface of outermost shaft section 31a is a helical flight 43a. Similarly arranged and welded or otherwise secured to the surface of intermediate shaft section 31b is a helical flight 43b, and similarly arranged and welded to the surface of the innermost shaft section 31c is a helical flight 43c. In the end 30 of the innermost shaft section 31c is an opening 44 by which the sweep auger 32 thus assembled may be rigidly connected to the output shaft 29 of the upper gear box 27 of the bottom silo unloader illustrated in FIG. 1.

In accordance with the embodiment of the invention illustrated by FIG. 2 the flights 43a, 43b and 43c have the same radial height (or depth) which is uniform lengthwise of the shaft section about which they helically extend. Flight 43c extends the full length of shaft section 31c and has a constant pitch. Flight 43b extends the full length of shaft section 31b outside opening 41 and its pitch is constant although less than the pitch of flight 43a. Flight 43a similarly extends the full length of outermost shaft section 31a except along the portion thereof received in opening 42 and its pitch is constant and less than the pitch of flight 43b. In one reduction to practice of the invention, the exposed portion of shaft sections 31a, 31b and 31c each had a length of three feet. The diameters of the shaft sections were respectively:

Shaft section 31a — 1 inch
Intermediate shaft section 31b — 2 inches
Innermost shaft section 31c — 3 inches The radial height of each of flights 43a, 43b and 43c was also 1 inch. Sweep auger 32 thus had an outside diameter including its helical flighting of a constant 5 inches along the length of its innermost shaft section which stepped down to a uniform outside diameter of 4 inches along the length of its intermediate shaft section and which in turn stepped down to a uniform outside diameter of 3 inches along the length of its outermost shaft section. The volume or loading capacity of the receiving helical channels 45 of the flights on each said shaft sections by mathematical calculation can be shown to be least along the length of the outermost section, greater along the length of the intermediate section and greatest along the length of the intermost section. In the specific reduction to practice where the pitch of the flight of each section corresponded to the outer diameter of the section, it was determined that the helical flow channel 45b of the intermediate section had a volume more than twice the volume of channel 45a on the outermost section; and the volume of channel 45c on the innermost section increased another two-thirds. Thus the volume of the succeeding intermediate and innermost sections 45b and 45c of the auger feed channel are adequate to move material collected by the outermost auger section 45a along the length thereof to the discharge hopper 11 for conveyance by discharge auger 14 to outside the silo. Both the intermediate and innermost auger sections are therefore capable of simultaneously collecting larger volumes of material as it is cut by the sweepwise movement of the sweep auger affording an effective cutting cavity of essentially pear-shape about the sweep auger. It will be further appreciated that the design of the sweep auger is such that its shaft is of greater cross section where it would be expected to meet the greatest amount of resistance to its sweepwise movement and said shaft portion of greater cross section also supports the heaviest part of the load being conveyed by the sweep auger lengthwise thereof to the discharge hopper.

Figure 3:
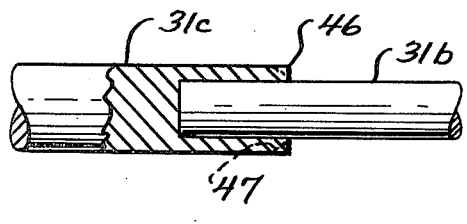
FIG. 3 is an enlarged partially sectioned and fragmented view which illustrates details in assembling of the shaft sections comprising the sweep auger of FIG. 2.
Figure 4:
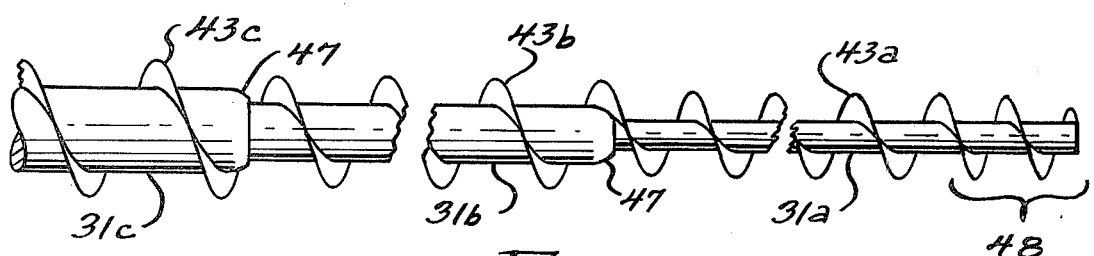
FIG. 4 is a partially fragmented view otherwise generally similar to FIG. 2 and showing a second embodiment of the invention.

The step at the joinder of the shaft sections over which the flowing material must rise in its progress to the inner end 30 of the sweep auger for exit to the discharge hopper may retard slightly the transfer of the flowing material from one section to the next. However, this retardation effectively contributes to the increased loading capacity of the succeeding auger sections and thus is not a disadvantage. However, if desired or necessary, corner 46 may be rounded off as indicated by dotted lines 47 in FIG. 3. FIG. 4 illustrates a further embodiment of the invention wherein not only are corners 46 at the junction of the intermediate shaft section 31g with the innermost and outermost sections 31a and 31c rounded off as identified at 47, but the pitch of the first turn or few of the flight 43a on the outermost shaft section 31a at the outer end 48 thereof is slightly less than the pitch of the remaining turns of the flight along said shaft section.

In the aforesaid description preferred embodiments of the invention have been set forth. It should be understood, however, the other modifications of the invention will be obvious to those skilled in the art and are intended to be included within the scope of the appended claims which define the invention.

Furthermore, it will be understood that in the above description of the invention and the bottom silo unloader in which it is used and also in the appended claims, the term "silo" is intended to and does include a bin as well as other storage structures of all kinds, both sealed and unsealed, except where so specifically designated.

Having described the invention, I claim:

1. In a bottom silo unloader having a sweep auger drivingly supported at its inner end for rotation about a transverse related vertical axis and for simultaneous rotation about its own axis, the improvement wherein the sweep auger comprises a series of helical flight bearing shaft sections of which the outermost shaft section has the smallest diameter and each succeeding shaft section in a direction inwardly therefrom has a larger diameter than the immediately preceding shaft section, and wherein the helical flights about each of the shaft sections all have the same radial depth, the loading capacity of the channels between the flights of each succeeding shaft section being larger than that to the preceding shaft section.

2. The improvement according to claim 1 wherein the pitch of the helical flight on the outermost shaft section is narrowest and the pitch of the helical flight on each succeeding shaft section is wider than the pitch of the helical flight on the immediately preceding shaft section.

3. The improvement according to claim 2 wherein the depth and pitch of the helical flight on each shaft section is constant throughout the length of the respective shaft section.

4. The improvement according to claim 2 wherein the pitch of the helical flight on each shaft section other than the outermost shaft section is constant throughout the length thereof, the pitch of the helical flight on the outermost shaft section being less at the outermost end of the sweep auger than inwardly thereof.

5. The improvement according to claim 1 wherein the radial depth of the channels between the helical flights on each shaft section is constant and the width thereof on each succeeding shaft section is greater than on the immediately preceding shaft section.

6. The improvement according to claim 1 wherein the shaft sections comprise separately formed telescopically connected cylindrical members each having a helical flight thereabout the radial height of which is constant.

7. In a bottom silo unloader having a sweep auger drivingly supported at its inner end for rotation about a transverse related vertical axis and for simultaneous rotation about its own axis, the improvement wherein the sweep auger comprises a series of helical flight bearing shaft sections of which the outermost shaft section has the smallest diameter and each succeeding section in the direction inwardly therefrom has a larger diameter than the immediately preceding shaft section, and wherein the depth and pitch of the helical flight on each shaft section other than the outermost shaft section is constant throughout the length thereof, the pitch of the helical flight on the outermost shaft section being less at the outermost end of the sweep auger than inwardly thereof, the loading capacity of the channels between the flights of each succeeding shaft section being larger than that of the preceding shaft section.

* * * * *

UNITED STATES PATENT OFFICE
CERTIFICATE OF CORRECTION

PATENT NO. : 4,015,734
DATED : April 5, 1977
INVENTOR(S) : Jonathan J. Laidig

It is certified that error appears in the above–identified patent and that said Letters Patent are hereby corrected as shown below:

Column 1, line 40, Change "above" to --able--;

Column 3, line 35, Change "mounted on" to --mounted in--;

Column 6, line 8, Change "than that to" to --than that of--;

Signed and Sealed this

Twenty-first Day of June 1977

[SEAL]

Attest:

RUTH C. MASON
Attesting Officer

C. MARSHALL DANN
Commissioner of Patents and Trademarks